US012705739B2

(12) United States Patent
Shafiee et al.

(10) Patent No.: US 12,705,739 B2
(45) **Date of Patent: *Aug. 11, 2026**

(54) AUTOMATED EVALUATION OF HUMAN EMBRYOS

(71) Applicants: THE BRIGHAM AND WOMEN'S HOSPITAL, INC., Boston, MA (US); THE GENERAL HOSPITAL CORPORATION, Boston, MA (US)

(72) Inventors: Hadi Shafiee, Boston, MA (US); Charles Bormann, Boston, MA (US); Manoj Kumar Kanakasabapathy, Boston, MA (US); Prudhvi Thirumalaraju, Boston, MA (US)

(73) Assignees: THE BRIGHAM AND WOMEN'S HOSPITAL, INC., Boston, MA (US); THE GENERAL HOSPITAL CORPORATION, Boston, MA (US)

( * ) Notice: Subject to any disclaimer, the term of this patent is extended or adjusted under 35 U.S.C. 154(b) by 252 days.

This patent is subject to a terminal disclaimer.

(21) Appl. No.: 18/507,351

(22) Filed: Nov. 13, 2023

(65) Prior Publication Data

US 2024/0078675 A1 Mar. 7, 2024

Related U.S. Application Data

(63) Continuation of application No. 17/718,508, filed on Apr. 12, 2022, now Pat. No. 11,816,753, which is a (Continued)

(51) Int. Cl.
*G06T 7/00* (2017.01)

(52) U.S. Cl.
CPC .. *G06T 7/0012* (2013.01); *G06T 2207/10024* (2013.01); *G06T 2207/20036* (2013.01); (Continued)

(58) Field of Classification Search
CPC ......... G06T 7/0012; G06T 2207/10024; G06T 2207/20036; G06T 2207/20081; G06T 2207/20084; G06T 2207/30044
See application file for complete search history.

(56) References Cited

U.S. PATENT DOCUMENTS

2004/0076999 A1* 4/2004 Faeldt ....................... G06T 7/20 435/6.1
2009/0215085 A1* 8/2009 Oehninger ........... G01N 33/689 250/282
(Continued)

OTHER PUBLICATIONS

EP Office Action for corresponding EP Application No. 18862193.2, dated Jul. 17, 2024, 4 pages.
(Continued)

*Primary Examiner* — Van D Huynh
(74) *Attorney, Agent, or Firm* — Tarolli, Sundheim, Covell & Tummino LLP

(57) ABSTRACT

Systems and methods are provided for provided for automatic evaluation of a human embryo. An image of the embryo is obtained and provided to a neural network to generate a plurality of values representing the morphology of the embryo. The plurality of values representing the morphology of the embryo are evaluated at an expert system to provide an output class representing one of a current quality of the embryo, a future quality of the embryo, a likelihood that implantation of the embryo will be successful, and a likelihood that implantation of the embryo will result in a live birth.

20 Claims, 2 Drawing Sheets

Related U.S. Application Data continuation of application No. 16/651,269, filed as application No. PCT/US2018/053710 on Oct. 1, 2018, now Pat. No. 11,321,831.

(60) Provisional application No. 62/651,658, filed on Apr. 2, 2018, provisional application No. 62/565,237, filed on Sep. 29, 2017.

(52) U.S. Cl.
CPC ............... *G06T 2207/20081* (2013.01); *G06T 2207/20084* (2013.01); *G06T 2207/30044* (2013.01)

(56) References Cited

U.S. PATENT DOCUMENTS

2011/0092762 A1* 4/2011 Wong .................... G06T 7/0012 435/6.1
2012/0257008 A1* 10/2012 Taylor .................. H04N 23/698 348/E5.026
2014/0087415 A1* 3/2014 Ramsing ............... G06T 7/0016 435/29
2014/0247972 A1* 9/2014 Wang .................. G06V 10/774 382/133
2014/0247973 A1* 9/2014 Moussavi ............ G06V 10/774 382/133
2015/0268227 A1* 9/2015 Tan ....................... G06T 7/0016 435/29
2019/0042958 A1* 2/2019 Letterie ................ G06V 20/698
2020/0110924 A1* 4/2020 Shinoda ............... G06V 10/764

OTHER PUBLICATIONS

CN Office Action for corresponding Application No. 201880069858.X with a mailing date of Oct. 26, 2023, pp. 1-9.

* cited by examiner

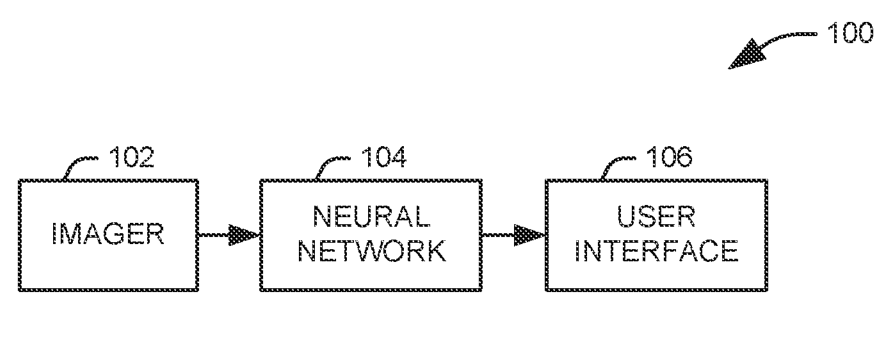
FIG. 1
200
206
IMAGER
202
CONVOLUTIONAL NEURAL NETWORK
204
GENETIC ALGORITHM
208
USER INTERFACE
FIG. 2
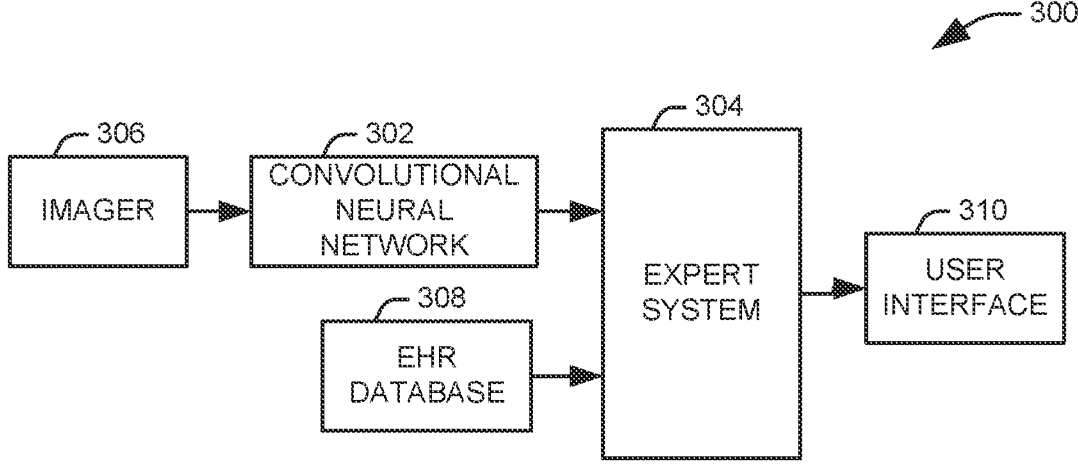
FIG. 3

AUTOMATED EVALUATION OF HUMAN EMBRYOS

RELATED APPLICATIONS

The present application is a continuation of U.S. patent application Ser. No. 17/718,508 filed Apr. 12, 2022, which is a continuation of U.S. patent application Ser. No. 16/651,269 filed Mar. 26, 2020, now U.S. Pat. No. 11,321,831, which is a 371 of PCT/US2018/053710 filed Oct. 1, 2018 and claims priority to U.S. Provisional Patent Application Ser. No. 62/565,237 filed Sep. 29, 2017 entitled ARTIFICIAL INTELLIGENCE-BASED SYSTEM FOR EMBRYOLOGY and U.S. Provisional Patent Application Ser. No. 62/651,658 filed Apr. 2, 2018 entitled AUTOMATED PREDICTION OF HUMAN EMBRYO DEVELOPMENTAL FATE. The entire contents of each are incorporated herein by reference in its entirety for all purposes.

TECHNICAL FIELD

The present invention relates generally to the field of medical decision support, and more particularly to automated clinical evaluation of human embryos.

BACKGROUND OF THE INVENTION

Infertility is an underestimated healthcare problem that affects over forty-eight million couples globally and is a cause of distress, depression, and discrimination. Although assisted reproductive technologies (ART) such as in-vitro fertilization (IVF) has alleviated the burden of infertility to an extent, it has been inefficient with an average success rate of approximately twenty-six percent reported in 2015 in the US. IVF remains as an expensive solution, with a cost between $7000 and $20,000 per ART cycle in the US, which is generally not covered by insurance. Further, many patients require multiple cycles of IVF to achieve pregnancy. Non-invasive selection of the top-quality embryo for transfer is one of the most important factors in achieving successful ART outcomes, yet this critical step remains a significant challenge.

Embryos are usually transferred to a patient's uterus during either the cleavage or the blastocyst stage of development. Embryos are described as being at the cleavage stage two or three days after fertilization. Cleavage stage embryos are generally selected for transfer based on cell number, degree of cellular fragmentation and the overall symmetry of the blastomeres. Embryos reach the blastocyst stage five or six days after fertilization. Blastocysts have fluid filled cavities and two distinguishable cell types, the trophectoderm and the inner cell mass (ICM). Blastocysts are generally selected for transfer based on the expansion of the blastocoel cavity and the quality of the trophectoderm and ICM. Traditional methods of embryo selection rely on visual embryo morphological assessment and are highly practice dependent and subjective. In addition, embryos are subject to removal from tightly controlled culture environments during manual assessments, which affects embryos negatively. Advances in time-lapse imaging (TLI) techniques have enabled regular and automated data acquisition of embryo development under controlled environments, along with identifying objective morphokinetic parameters.

SUMMARY OF THE INVENTION

In accordance with an aspect of the present invention, a method is provided for automatic evaluation of a human embryo. An image of the embryo is obtained and provided to a neural network to generate a plurality of values representing the morphology of the embryo. The plurality of values representing the morphology of the embryo are evaluated at an expert system to provide an output class representing one of a current quality of the embryo, a future quality of the embryo, a likelihood that implantation of the embryo will be successful, and a likelihood that implantation of the embryo will result in a live birth.

In accordance with another aspect of the present invention, a system is provided for automatic evaluation of a human embryo. An imager acquires an image of the embryo on a specific day of development. A convolutional neural network calculates from the image of the embryo at least one output value representing one of a current quality of the embryo, a future quality of the embryo, a likelihood that implantation of the embryo will be successful, and a likelihood that implantation of the embryo will result in a live birth.

In accordance with yet another aspect of the present invention, a system is provided for automatic evaluation of a human embryo. An imager acquires an image of the embryo on a specific day of development. A convolutional neural network generates a plurality of values representing the morphology of the embryo from the image of the embryo. An expert system evaluates the plurality of values representing the morphology of the embryo to provide an output class representing one of a current quality of the embryo, a future quality of the embryo, a likelihood that implantation of the embryo will be successful, and a likelihood that implantation of the embryo will result in a live birth.

BRIEF DESCRIPTION OF THE DRAWINGS

The foregoing and other features of the present invention will become apparent to those skilled in the art to which the present invention relates upon reading the following description with reference to the accompanying drawings, in which:

FIG. 1 illustrates a system for automatic evaluation of a human embryo;

FIG. 2 provides one example of a system in which a convolutional neural network is used in combination with another expert system;

FIG. 3 illustrates another method for selecting and applying a therapeutic intervention for a patient having a disorder;

DETAILED DESCRIPTION

Figure 4:
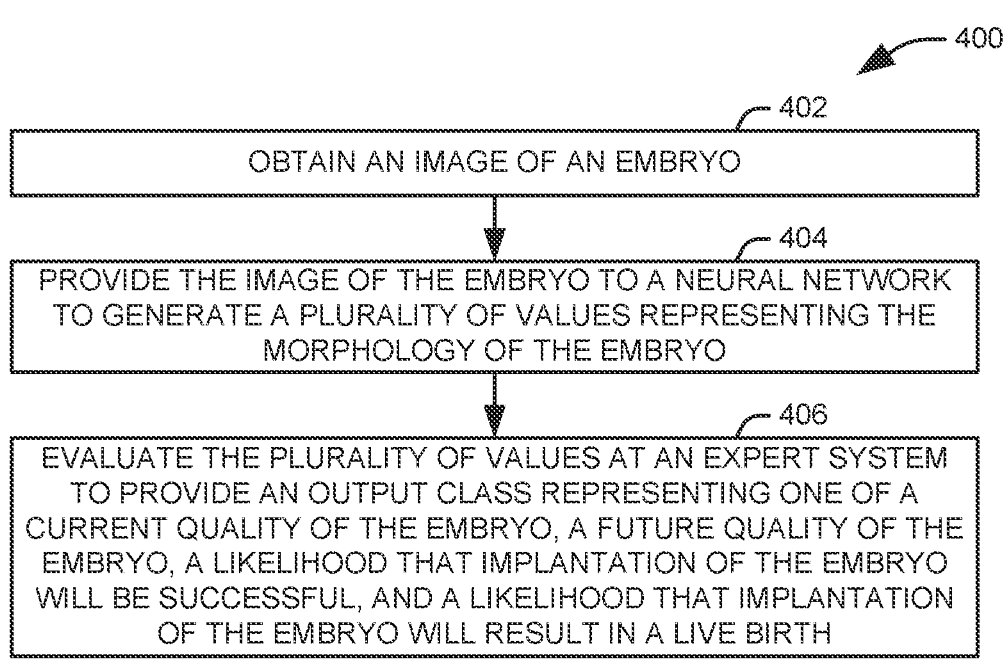
FIG. 4 illustrates a method for automatic evaluation of a human embryo.

Over the past decade, there has been growing interest in studying time-lapse imaging, connecting morphokinetic variables with important outcomes such as blastocyst formation, implantation and pregnancy potential. These advances in time-lapse imaging and new dimensions in embryo development data, have led to the formulation of multiple embryo selection algorithms (ESA), but these algorithms have provided poor predictive value. Studies have shown that the addition of time-lapse imaging systems to conventional manual embryo testing not only did not improve clinical outcomes but also increased the time of the embryo assessment.

Emulating the skill of highly trained embryologists in efficient embryo assessment in a fully automated system is a major unmet challenge in all of the previous work done in embryo computer-aided assessment. Current computer vision methods for embryo assessment are semi-automated, limited to measuring specific parameters providing metrics that require further analysis by embryologists, and require strictly controlled imaging systems. Previous attempts in developing systems using machine-learning approaches have required intensive image preprocessing followed by human-directed segmentation of embryo features for classification. Owing to the dependency of machine-learning approaches on image processing and segmentation, such methods suffer from the same limitations as computer vision techniques. Also, prior machine learning attempts were focused on classifying embryos at the blastocyst stage using limited datasets of mouse and bovine embryo images for training and testing, making the generalizability of their approach for human embryos questionable.

Here, we overcome this challenge by employing a deep neural networks pretrained with a large set of images for transfer learning human embryo classifications at clinically relevant stages of embryonic development. Unlike prior computer-aided algorithms used for embryo assessment, the systems and methods provided herein allows for automated embryo feature selection and analysis at the pixel level without any assistance by an embryologist. In one example, a convolutional neural network is applied to identify the shape, structure and texture variations between morphologically complex embryos. The system is resilient to changes in image illumination and quality due to data acquisition using multiple instruments.

FIG. 1 illustrates a system 100 for automatic evaluation of a human embryo. The system 100 includes an imager 102 that acquires an image of the embryo on at least one day of development. For example, the imager 102 can include one or more cameras, capable of producing images in the visible or infrared range, paired with appropriate optics to provide an image of an embryo. In practice, the imager 102 can be implemented to capture images of the embryo at multiple days of development as part of a time-lapse embryo imaging system. In one implementation, the imager 102 includes an attachment for a mobile device that operates with a camera of the mobile device to provide the embryo images. The housing for the attachment can 3-D printed using polylactic acid with dimensions of 82×34×48 mm. An acrylic lens can be included in the housing to provided appropriate magnification for the embryo images.

In another implementation, the imager 102 can be implemented as a stand-alone system with an optical housing that is 3-D printed from polylactic acid and overall dimensions of 62×92×175 mm. The housing contains an electronic circuit with a white light-emitting diode, a three-volt battery, and a single pole double-throw switch. The embryo sample is transilluminated, with a 10× Plan-Achromatic objective lens for image magnification and a complementary metal-oxide-semiconductor (CMOS) image sensor for embryo image data acquisition. The CMOS sensor can be connected to a single-board computer to process the captured images. The imager 102 can be connected to a mobile device via a wireless connection (e.g., Wi-Fi, Bluetooth, or a similar connection) for data processing and visualization.

The one or more images obtained at the imager 102 are provided to a neural network 104 that calculates, from the image of the embryo, at least one output value representing one of a current grade of the embryo, a future grade of the embryo, whether. It will be appreciated that the neural network can be implemented as software instructions stored on a non-transitory computer readable medium and executed by an associated processor. In one example, the neural network 104 can be implemented on a cloud computing system. In one implementation, the neural network 104 can be a convolutional neural network, which is a feed-forward artificial neural network that includes convolutional layers, which effectively apply a convolution to the values at the preceding layer of the network to emphasize various sets of features within an image. In a convolutional layer, each neuron is connected only to a proper subset of the neurons in the preceding layer, referred to as the receptive field of the neuron. In the illustrated example, the convolutional neural network is implemented using the Xception architecture. In one implementation, at least one chromatic value (e.g., a value for an RGB color channel, a YCrCb color channel, or a grayscale brightness) associated with each pixel is provided as an initial input to the convolutional neural network.

In another implementation, the neural network 104 can be implemented as a recurrent neural network. In a recurrent neural network, the connections between nodes in the network are selected to form a directed graph along a sequence, allowing it to exhibit dynamic temporal behavior. In another implementation, the neural network 104 is implemented and trained as a discriminative network in a generative adversarial model, in which a generative neural network and the discriminative network provide mutual feedback to one another, such that the generative neural network produces increasingly sophisticated samples for the discriminative network to attempt to classify.

The results of the neural network 104 can be provided to a user at an associated user interface 106. For example, the user interface 106 can include at least an output device, such as a display, and appropriate software, stored on a non-transitory medium and executed by an associated processor, for receiving the output of the convolutional neural network 104 and presenting it at the output device. In one implementation, the user interface 106 can include a mobile device that communicates wirelessly with the neural network.

In one implementation, the neural network 104 is trained on a plurality of images of embryos taken on a first day of embryo development, for example, at eighteen hours after fertilization, that are classified into either a first class, representing normal fertilization of the embryo, or a second class, representing an abnormal fertilization of the embryo. For the purpose of this application, a normally fertilized embryo is an embryo that contains two pronuclei and an abnormally fertilized embryo is an embryo with any other number of pronuclei. Accordingly, in this implementation, abnormal embryos can be detected at an early stage without the intervention of a trained embryologist.

In another implementation, the convolutional neural network 104 is trained on a plurality of images of embryos taken on a third day of embryo development, for example, at seventy hours after fertilization, to select a current grade for the embryo. For the purpose of this application, an embryo can be classified as one of five grades, representing the degree of fragmentation and the variance in size among the cells in the embryo, with a first grade representing equal sized cells and no visible fragmentation, a second grade representing equal sized cells and minimal fragmentation, a third grade representing mostly equal sized cells and moderate fragmentation, a fourth grade in which the cells are of unequal size, with no to moderate fragmentation, and a fifth state representing heavy fragmentation regardless of the variance among the cell sizes.

In still another implementation, the convolutional neural network 104 is trained on a plurality of images of embryos taken on a fifth day of embryo development, for example, at one hundred thirteen hours after fertilization, to select a current grade for the embryo. During the fifth day of development, a normally developing embryo will have developed into a blastocyst. On the fifth day, embryos are conventionally graded based on the combinations of a degree of blastocoel expansion, an inner cell mass quality, and trophectoderm quality along with multiple classes of nonblastocysts. In one example, the classification is binary, simply determining if the embryo is a blastocyst or is not a blastocyst. In another example, the embryos are classified as one of five grades, with a first grade representing embryos that fail to develop to the morula stage, a second grade representing embryos that failed to develop past the morula stage, a third grade that represents early blastocysts, a fourth stage that represents blastocysts that fail to meet the criteria for cryogenic preservation, and a fifth stage representing blastocysts that meet the criteria for cryogenic preservation, and the classifier is trained to distinguish among these five grades.

In a further implementation, the convolutional neural network 104 is trained on a plurality of images of embryos taken on a first day of embryo development to predict a current grade for the embryo on a later day. For example, an image taken at the first day can be used to predict a grade at the third day or a grade at the fifth day. Similarly, an image taken at the third day can be used to predict a grade at the fifth day, including either of the binary determination if the embryo reached the blastocyst stage or a determination among the five grades listed above. And in a still further implementation, the convolutional neural network can be trained on images from one or more days of development, and trained to predict either whether implantation of the embryo will be successful, that is, result in a pregnancy or whether implantation of the embryo will result in a life birth.

The inventors have found that the predictive capability of the convolutional neural network 104 can be enhanced by using the convolutional neural network 104 in combination with another expert system (not shown). In practice, any of a variety of experts systems can be utilized in combination with the convolutional neural network, including support vector machines, random forest, self-organized maps, fuzzy logic systems, data fusion processes, ensemble methods, rule based systems, genetic algorithms, and artificial neural networks. It will be appreciated that the additional expert system may be trained on features from multiple stages of embryonic development as well as with features that are external to the images, such as biometric parameters of an egg donor, a sperm donor, or a recipient of the embryo.

FIG. 2 provides one example of a system 200 in which a convolutional neural network 202 is used in combination with another expert system 204. In this instance, the other expert system is a genetic algorithm 204 that receives the output of the convolutional neural network 202 and generates a metric representing the quality of an embryo being evaluated. Each of the convolutional neural network 202 and the genetic algorithm 204 can be implemented as software instructions stored on a non-transitory computer readable medium and executed by an associated processor. The quality of the embryo can be a binary categorical variable, representing the success or failure of the implantation or a numerical grade of the embryo. In addition to the output of the convolutional neural network, the genetic algorithm 204 can also use biometric parameters representing of one of a patient receiving the embryo, a sperm donor who provided sperm used to create the embryo, an egg utilized to produce the human embryo, and an egg donor who provided the egg in determining a quality of the embryo. Further, the genetic algorithm 204 can utilize the outputs of multiple neural networks in determining the embryo quality, which can include other convolutional neural networks, for example, receiving as input an image of the embryo on a different day of development than the convolutional neural network 202, recurrent neural networks, capsule networks, and generative adversarial networks.

The system 200 includes an imager 206 that acquires an image of for each embryo on at least a fifth day of development. A first training set of embryo images can then be generated from a set of images and a known grade of the embryo on the fifth day and used to train the convolutional neural network, such that an output for each image is a set of five values, each representing the likelihood that the embryo is in one of the five grades defined above for the fifth day of development. It will be appreciated that the features for each embryo can include values external to the image as well as the extracted features from the convolutional neural network 202.

A second training set of images, representing embryos of known quality, can be generated at the imager 206 and provided to the trained convolutional neural network 202 to generate a set of convolutional neural network outputs and known embryo qualities. For example, the known quality can be an outcome of the implantation or an average (e.g., arithmetic mean or median) of numerical grades provided via manual assessment by a set of embryologists from different institutions. This set of outputs and the embryo qualities can be provided as training data to the genetic algorithm. In the illustrated implementation, the chromosome for the genetic algorithm is a set of five weights for the convolutional neural network outputs, and the fitness function is a sum of the absolute or squared error between the weighted outputs of the convolutional neural networks and the known quality of the embryo they represent. The genetic algorithm 204 is an iterative algorithm that generates new solutions from the best candidates in an initial population of candidate solutions, as determined by the fitness function, and eliminates low performing candidate solutions according to the defined fitness function to form a new generation of candidate solutions. This is repeated until a termination event occurs, such as the passage of a predefined time period, the performance of a predetermined number of iterations, or a fitness value that meets a threshold value. New candidate solutions are generated via genetic operators, including mutation, in which values for existing solutions are changed by a random amount, and crossover, in which a set of two or more "parent" solutions are combined, with values for each chromosome of the "child" solution being selected from one of the parents. In some implementations, one or more high performing candidate solutions from each generation are retained across generations, to ensure that existing good solutions are not lost via genetic operations.

The output of the genetic algorithm 204 is a set of weights that optimally predict the quality of the embryo from the outputs of the convolutional neural network 202. This output can be provided to a user at an associated user interface 208. The inventors have found that a combination of the convolutional neural network 202 with a genetic algorithm 204 trained in this manner can provide predictions of implantation outcomes that meet or exceed that of experienced embryologists. As a result, the selection of embryos for transfer can be automated without any significant loss of accuracy.

FIG. 3 provides another example of a system 300 in which a convolutional neural network 302 is used in combination with another expert system 304. In this instance, the other expert system 304 receives the output of the convolutional neural network, as well as a set of additional features, and provides an output representing the likelihood that implantation of the embryo is likely to be successful. In the illustrated implementation, the convolutional neural network 302 is trained separately from the other expert system 304.

The system 300 includes an imager 306 that acquires an image of for each embryo on at least one selected day of development. This image is then provided to the convolutional neural network 302. It will be appreciated, however, that multiple images, taken from different days, can be used at one or multiple convolutional neural networks. The convolutional neural network 302 generates a plurality of values representing the morphology of the embryo from the provided one or more images. This plurality of values, as well as a plurality of features representing biometric parameters of one of a patient receiving the embryo, a sperm donor who provided sperm used to create the embryo, an egg utilized to produce the human embryo, and an egg donor who provided the egg to the expert system, are provided to the expert system 304. The biometric parameters can include, for example, an age of the egg, a body mass index of the patient, an age of the patient, an egg maturation status, a method of fertilization for the embryo, a treatment regime for the patient, a hormonal profile of the patient, and an age of the egg donor, a past diagnosis of a condition of the patient, a past diagnosis of a condition of the sperm donor, and an endometrium thickness of the patient. In the illustrated implementation, the biometric parameters are retrieved from an electronic health records (EHR) database 308.

The expert system 304 provides an output class representing one of a current quality of the embryo, a future quality of the embryo, a likelihood that implantation of the embryo will be successful, and a likelihood that implantation of the embryo will result in a live birth from the plurality of values representing the morphology of the embryo from the provided one or more images and the plurality of biometric features. The output class is then provided to a user at a user interface 310.

In one implementation, the expert system 304 is implemented as a feed-forward neural network. In this approach, the convolutional neural network 302 is pre-trained on training images and the weights within the network are frozen. The feed-forward neural network receives the biometric parameters at an input layer, with the output of the convolutional neural network is injected into a hidden layer of the feedforward neural network. A final layer of the feed-forward neural network can be implemented as a softmax layer to provide a classification result. The feed-forward neural network is trained on embryo images and a known quality for each training image to provide the illustrated system.

In view of the foregoing structural and functional features described above, a method in accordance with various aspects of the present invention will be better appreciated with reference to FIG. 4. While, for purposes of simplicity of explanation, the methods of FIG. 4 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a method in accordance with an aspect the present invention.

FIG. 4 illustrates a method 400 for automatic evaluation of a human embryo. At 402, an image of the embryo is obtained. At 404, the image of the embryo is provided to a neural network to generate a plurality of values representing the morphology of the embryo. For example, the neural network can include any of a recurrent neural network, a convolutional neural network, and a discriminative classifier trained as part of a generative adversarial network. At 406, the plurality of values representing the morphology of the embryo are evaluated at an expert system to provide an output class representing one of a current quality of the embryo, a future quality of the embryo, a likelihood that implantation of the embryo will be successful, and a likelihood that implantation of the embryo will result in a live birth.

In one implementation, in addition to the morphological features provided by the neural network, a plurality of features representing biometric parameters of one of a patient receiving the embryo, an egg utilized to produce the human embryo, a sperm donor who provided sperm used to create the embryo, and an egg donor who provided the egg can be provided to the expert system for use in determining the output class. These biometric parameters can include at least one of an age of the egg, a body mass index of the patient, an age of the patient, an egg maturation status, a method of fertilization for the embryo, a treatment regime for the patient, a hormonal profile of the patient, and an age of the egg donor, a past diagnosis of a condition of the patient, a past diagnosis of a condition of the sperm donor, and an endometrium thickness of the patient. For example, the expert system can be implemented as a feedforward neural network. In another implementation, the expert system includes a genetic algorithm that calculates a plurality of weights corresponding to the plurality of values, such that the output is determined as weighted linear combination of the plurality of values.

Figure 5:
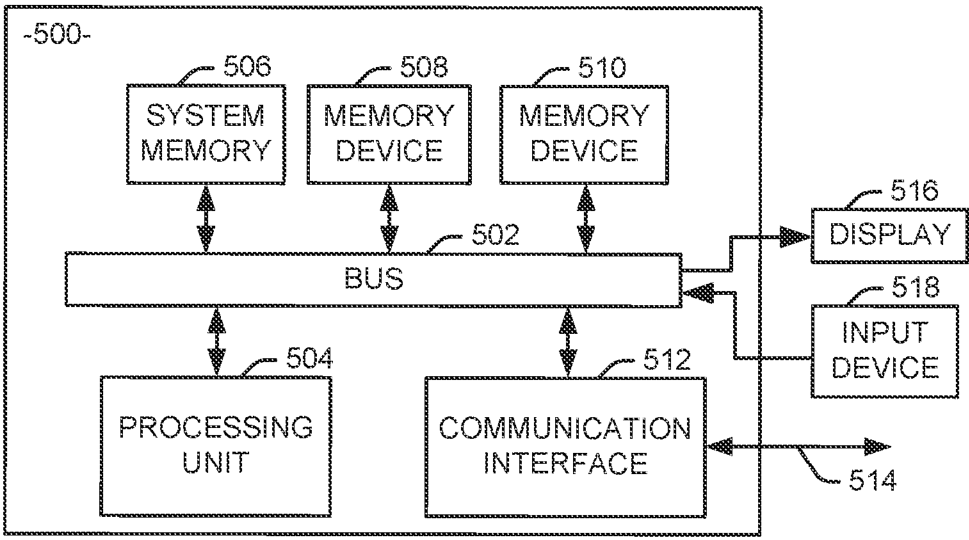
FIG. 5 is a schematic block diagram illustrating an exemplary system of hardware components capable of implementing examples of the systems and methods disclosed herein.

FIG. 5 is a schematic block diagram illustrating an exemplary system 500 of hardware components capable of implementing examples of the systems and methods disclosed in FIGS. 1-4, such as the automated embryo evaluation system illustrated in FIG. 1. The system 500 can include various systems and subsystems. The system 500 can be any of personal computer, a laptop computer, a workstation, a computer system, an appliance, an application-specific integrated circuit (ASIC), a server, a server blade center, or a server farm.

The system 500 can includes a system bus 502, a processing unit 504, a system memory 506, memory devices 508 and 510, a communication interface 512 (e.g., a network interface), a communication link 514, a display 516 (e.g., a video screen), and an input device 518 (e.g., a keyboard and/or a mouse). The system bus 502 can be in communication with the processing unit 504 and the system memory 506. The additional memory devices 508 and 510, such as a hard disk drive, server, stand-alone database, or other non-volatile memory, can also be in communication with the system bus 502. The system bus 502 interconnects the processing unit 504, the memory devices 506-510, the communication interface 512, the display 516, and the input device 518. In some examples, the system bus 502 also interconnects an additional port (not shown), such as a universal serial bus (USB) port.

The system 500 could be implemented in a computing cloud. In such a situation, features of the system 500, such as the processing unit 504, the communication interface 512, and the memory devices 508 and 510 could be representative of a single instance of hardware or multiple instances of hardware with applications executing across the multiple of instances (i.e., distributed) of hardware (e.g., computers, routers, memory, processors, or a combination thereof). Alternatively, the system 500 could be implemented on a single dedicated server.

The processing unit 504 can be a computing device and can include an application-specific integrated circuit (ASIC). The processing unit 504 executes a set of instructions to implement the operations of examples disclosed herein. The processing unit can include a processing core.

The additional memory devices 506, 508 and 510 can store data, programs, instructions, database queries in text or compiled form, and any other information that can be needed to operate a computer. The memories 506, 508 and 510 can be implemented as computer-readable media (integrated or removable) such as a memory card, disk drive, compact disk (CD), or server accessible over a network. In certain examples, the memories 506, 508 and 510 can comprise text, images, video, and/or audio, portions of which can be available in formats comprehensible to human beings.

Additionally or alternatively, the system 500 can access an external data source or query source through the communication interface 512, which can communicate with the system bus 502 and the communication link 514.

In operation, the system 500 can be used to implement one or more parts of an embryo evaluation system in accordance with the present invention. Computer executable logic for implementing the composite applications testing system resides on one or more of the system memory 506, and the memory devices 508, 510 in accordance with certain examples. The processing unit 504 executes one or more computer executable instructions originating from the system memory 506 and the memory devices 508 and 510. It will be appreciated that a computer readable medium can include multiple computer readable media each operatively connected to the processing unit.

Specific details are given in the above description to provide a thorough understanding of the embodiments. However, it is understood that the embodiments can be practiced without these specific details. For example, circuits can be shown in block diagrams in order not to obscure the embodiments in unnecessary detail. In other instances, well-known circuits, processes, algorithms, structures, and techniques can be shown without unnecessary detail in order to avoid obscuring the embodiments.

Implementation of the techniques, blocks, steps and means described above can be done in various ways. For example, these techniques, blocks, steps and means can be implemented in hardware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments can be described as a process which is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process is terminated when its operations are completed, but could have additional steps not included in the figure. A process can correspond to a method, a function, a procedure, a subroutine, a subprogram, etc. When a process corresponds to a function, its termination corresponds to a return of the function to the calling function or the main function.

Furthermore, embodiments can be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks can be stored in a machine readable medium such as a storage medium. A code segment or machine-executable instruction can represent a procedure, a function, a subprogram, a program, a routine, a subroutine, a module, a software package, a script, a class, or any combination of instructions, data structures, and/or program statements. A code segment can be coupled to another code segment or a hardware circuit by passing and/or receiving information, data, arguments, parameters, and/or memory contents. Information, arguments, parameters, data, etc. can be passed, forwarded, or transmitted via any suitable means including memory sharing, message passing, ticket passing, network transmission, etc.

For a firmware and/or software implementation, the methodologies can be implemented with modules (e.g., procedures, functions, and so on) that perform the functions described herein. Any machine-readable medium tangibly embodying instructions can be used in implementing the methodologies described herein. For example, software codes can be stored in a memory. Memory can be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" can represent one or more memories for storing data, including read only memory (ROM), random access memory (RAM), magnetic RAM, core memory, magnetic disk storage mediums, optical storage mediums, flash memory devices and/or other machine readable mediums for storing information. The terms "computer readable medium" and "machine readable medium" includes, but is not limited to portable or fixed storage devices, optical storage devices, wireless channels, and/or various other storage mediums capable of storing that contain or carry instruction(s) and/or data. It will be appreciated that a "computer readable medium" or "machine readable medium" can include multiple media each operatively connected to a processing unit.

While the principles of the disclosure have been described above in connection with specific apparatuses and methods, it is to be clearly understood that this description is made only by way of example and not as limitation on the scope of the disclosure.

Having described the invention, we claim:

1. A method for automatic evaluation of a human embryo, comprising:

receiving an image of the embryo at a fully-automated computing system;

generating a plurality of values at the fully-automated computing system, each of the plurality of values representing one of a shape, structure, and texture of the embryo;

evaluating the plurality of values at the fully-automated computing system to provide an output representing one of a current quality of the embryo, a future quality of the embryo, a likelihood that implantation of the embryo will be successful, and a likelihood that implantation of the embryo will result in a live birth.

2. The method of claim 1, wherein obtaining the image of the embryo comprises obtaining the image of the embryo on a first day of development, and the output represents a likelihood that the embryo currently has two pronuclei.

3. The method of claim 1, wherein obtaining the image of the embryo comprises obtaining the image of the embryo on a third day of development, and the output represents an expected grade of the embryo on a fifth day of development.

4. The method of claim 1, wherein generating the plurality of values at the fully-automated computing system, comprises providing the image of the embryo to a neural network implemented at the fully-automated computing system.

5. The method of claim 4, wherein the neural network is a convolutional neural network.

6. The method of claim 1, the method further retrieving a plurality of features at the fully-automated computing system, each of the plurality of features representing a biometric parameter of one of a patient receiving the embryo, an egg utilized to produce the human embryo, a sperm donor who provided sperm used to create the embryo, and an egg donor who provided the egg, wherein evaluating the plurality of values at the fully-automated computing system comprises evaluating the plurality of values and the plurality of features at the fully-automated computing system.

7. The method of claim 6, wherein the biometric parameters represented by the plurality of features include at least one of an age of the egg, a body mass index of the patient, an age of the patient, an egg maturation status, a method of fertilization for the embryo, a treatment regime for the patient, a hormonal profile of the patient, and an age of the egg donor, a past diagnosis of a condition of the patient, a past diagnosis of a condition of the sperm donor, and an endometrium thickness of the patient.

8. The method of claim 1, wherein the image of the embryo is an image of the embryo on one of a fifth day of development and a sixth day of development, and the output represents a likelihood that the embryo is a blastocyst.

9. The method of claim 1, wherein the image of the embryo is an image of the embryo on a fifth day of development and the output represents a current grade of the embryo.

10. A fully-automated system for automatic evaluation of a human embryo comprising:

a processor configured to:

receive an image of the embryo;

generate a plurality of values representing one of a shape, structure, and texture of the embryo from the image of the embryo; and provide an output representing one of (a) a future quality of the embryo, (b) a likelihood of the embryo's viability upon implantation, or (c) a likelihood that implantation of the embryo will result in a live birth, wherein the processor is trained to evaluate the plurality of values representing the morphology of a embryo and provide the likelihood based on evaluation of the plurality of values.

11. The system of claim 10, wherein generating the plurality of values at the fully-automated computing system, comprises providing the image of the embryo to a neural network implemented at the fully-automated computing system.

12. The system of claim 10, wherein the processor implements an expert system to provide the output, the expert system being trained on training images of embryos labeled with corresponding output values by a human expert.

13. The system of claim 12, wherein the expert system is trained on training images of embryos acquired on a first day of development, each labeled with a likelihood that the embryo depicted in training image currently has two pronuclei.

14. The system of claim 12, wherein the expert system is trained on training images of embryos acquired on a third day of development, each labeled with an expected grade of the embryo depicted in the training image on a fifth day of development.

15. The system of claim 12, wherein the expert system is trained on training images of embryos acquired on one of a fifth day of development and a sixth day of development, each labeled with a likelihood that the embryo depicted in the training image is a blastocyst.

16. The system of claim 12, wherein the expert system is trained on images of embryos acquired on a fifth day of development labeled with a current grade of the embryo depicted in the training image.

17. The system of claim 12, wherein the expert system is implemented as a convolutional neural network.

18. The system of claim 12, the expert system further being trained on a plurality of features associated with the training image, each of the plurality of features representing a biometric parameter of one of a patient receiving the embryo depicted in the training image, an egg utilized to produce the embryo depicted in the training image, a sperm donor who provided sperm used to create the embryo depicted in the training image, and an egg donor who provided the egg.

19. The system of claim 12, wherein the biometric parameters represented by the plurality of features include at least one of an age of the egg, a body mass index of the patient, an age of the patient, an egg maturation status, a method of fertilization for the embryo depicted in the training image, a treatment regime for the patient, a hormonal profile of the patient, and an age of the egg donor, a past diagnosis of a condition of the patient, a past diagnosis of a condition of the sperm donor, and an endometrium thickness of the patient.

20. A fully-automated system for automatic evaluation of a human embryo comprising:

a processor configured to:

receive an image of the embryo;

generate a plurality of values representing one of a shape, structure, and texture of the embryo from the image of the embryo at an expert system being trained on training images of embryos labeled with corresponding output values by a human expert; and provide an output representing one of (a) a future quality of the embryo, (b) a likelihood of the embryo's viability upon implantation, or (c) a likelihood that implantation of the embryo will result in a live birth, wherein the processor is trained to evaluate the plurality of values representing a morphology of the embryo and provide the likelihood based on evaluation of the plurality of values.

* * * * *